(12) United States Patent
Brueckner et al.

(10) Patent No.: US 9,959,634 B2
(45) Date of Patent: May 1, 2018

(54) METHOD AND SYSTEM FOR IDENTIFYING DEPTH DATA ASSOCIATED WITH AN OBJECT

(75) Inventors: Peter Gregory Brueckner, Santa Cruz, CA (US); Iain Richard Tyrone McClatchie, Los Altos, CA (US); Matthew Thomas Valente, Mountain View, CA (US)

(73) Assignee: Google LLC, Mountain View, CA (US)

( * ) Notice: Subject to any disclaimer, the term of this patent is extended or adjusted under 35 U.S.C. 154(b) by 873 days.

(21) Appl. No.: 13/418,744

(22) Filed: Mar. 13, 2012

(65) Prior Publication Data

US 2013/0242086 A1    Sep. 19, 2013

(51) Int. Cl.
*H04N 7/18* (2006.01)
*G06T 7/571* (2017.01)

(52) U.S. Cl.
CPC .... *G06T 7/571* (2017.01); *G06T 2207/10016* (2013.01); *G06T 2207/20221* (2013.01)

(58) Field of Classification Search
CPC ....... G01B 11/022; G01B 11/024; H04N 7/18
USPC ................................................. 348/135–142
See application file for complete search history.

(56) References Cited

U.S. PATENT DOCUMENTS

| | | | |
|---|---|---|---|
| 4,053,934 A | 10/1977 | Kornreich et al. | |
| 5,293,415 A | 3/1994 | Hartley et al. | |
| 7,170,559 B2 | 1/2007 | Takada | |
| 7,646,932 B1 | 1/2010 | Peterson | |
| 7,860,343 B2 | 12/2010 | Tico et al. | |
| 8,436,860 B1* | 5/2013 | Milliron et al. | 345/474 |
| 2001/0019664 A1 | 9/2001 | Pilu | |
| 2003/0179418 A1 | 9/2003 | Wengender et al. | |
| 2004/0032980 A1* | 2/2004 | Harman | 382/154 |
| 2007/0164202 A1* | 7/2007 | Wurz et al. | 250/222.1 |
| 2009/0003698 A1 | 1/2009 | Milward et al. | |
| 2010/0034457 A1 | 2/2010 | Berliner et al. | |
| 2010/0085383 A1 | 4/2010 | Cohen et al. | |
| 2010/0172549 A1 | 7/2010 | Weiss | |
| 2010/0245684 A1 | 9/2010 | Xiao et al. | |

(Continued)

OTHER PUBLICATIONS

Kovacs et al., "Focus Area Extraction by Blind Deconvolution for Defining Regions of Interest", IEEE Transactions on Pattern Analysis and Machine Intelligence, vol. 29, No. 6, Jun. 2007, pp. 1080-1085.

(Continued)

*Primary Examiner* — Chikaodili E Anyikire
(74) *Attorney, Agent, or Firm* — Dority & Manning, P.A.

(57) ABSTRACT

Methods and systems for identifying depth data associated with an object are disclosed. The method includes capturing, with an image capturing device, a plurality of source images of the object. The image capturing device has a sensor that is tilted at a known angle with respect to an object plane of the object such that the image capturing device has a depth of field associated with each source image, the depth of field defining a plane that is angled with respect to the object plane. An image processor analyzes the plurality of source images to identify segments of the source images that satisfy an image quality metric. Position data is assigned to the identified segments of the source images, the position data including depth positions based on the plane defined by the depth of field.

22 Claims, 7 Drawing Sheets

(56) References Cited

U.S. PATENT DOCUMENTS

2011/0134224 A1    6/2011  McClatchie
2012/0162374 A1*   6/2012  Markas et al. ............... 348/46

OTHER PUBLICATIONS

Shaked et al., "Sharpness Measure: Towards Automatic Image Enhancement", In Proceedings of ICIP (1). 2005, 937-940.
International Search Report—2 pages.
Castano et al., "Omnifocused 3D Display Using the Nonfrontal Imaging Camera," *Computer Vision for Virtual Reality Based Human Communications,*1998 IEEE and ATR Workshop, Bombay, India, Jan. 3, 1998, pp. 28-34.
Krishan et al. "Range Estimation From Focus Using a Non-Frontal Imaging Camera," *International Journal of Computer Vision*, vol. 20, No. 3, Kluwer Academic Publishers, Norwell, US, Dec. 1, 1996, pp. 169-185.
Ikeoka et al., "Real-Time Depth Estimation with Wide Detectable Range Using Horizontal Planes of Sharp Focus Proceedings," *International Conference on Advanced Concepts for Intelligent Vision Systems*, Springer Berlin Heidelberg, Aug. 22, 2011, pp. 669-680.
Jarvis, "A Perspective on Range Finding Techniques for Computer Vision," *IEEE Transactions on Pattern Analysis and Machine Intelligence*, vol. PAMI-5, No. 2, Mar. 1, 1983, pp. 122-139.

\* cited by examiner

METHOD AND SYSTEM FOR IDENTIFYING DEPTH DATA ASSOCIATED WITH AN OBJECT

FIELD

The present disclosure relates generally to methods and systems for identifying depth data associated with objects.

BACKGROUND

Improvements in computer processing power have led to the availability of ultra high resolution digital images, including gigapixel images and terapixel images. These ultra high resolution images can be used to depict various objects or locations in intricate detail for observation by interested parties.

Current high resolution imagery is typically captured by compositing a single image from a large number of individual shots captured by a camera. For instance, the Google Art Project services provided by Google Inc. provide access to high resolution images of various works of art from worldwide galleries. However, such composited images fail to completely represent certain types of artwork. In this regard, photographic images do not reveal depth information about the object being captured. For instance, texture information from paintings is lost when relying on conventional photography techniques. Such texture information can reveal characteristics of the base material and the paint, such as brushstrokes, thicknesses, and the like.

Light detection and ranging (LIDAR) has been used to create depth maps. However, many curators of galleries containing high-value artwork have concerns about incident laser radiation that the use of LIDAR can impose on artwork.

SUMMARY

Aspects and advantages of the invention will be set forth in part in the following description, or may be obvious from the description, or may be learned through practice of the invention.

One exemplary aspect of the present disclosure is directed to a method for identifying depth information associated with an object. The method includes capturing, with an image capturing device, a plurality of source images of the object. The image capturing device has a sensor that is tilted at a known angle with respect to an object plane of the object such that the image capturing device has a depth of field associated with each source image, the depth of field defining a plane that is angled with respect to the object plane. An image processor analyzes the plurality of source images to identify segments of the source images that satisfy an image quality metric. Position data is assigned to the identified segments of the source images, the position data including depth positions based on the plane defined by the depth of field.

Other exemplary aspects of the present disclosure are directed to systems, apparatus, and computer readable media for generating a composite image from a plurality of source images.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
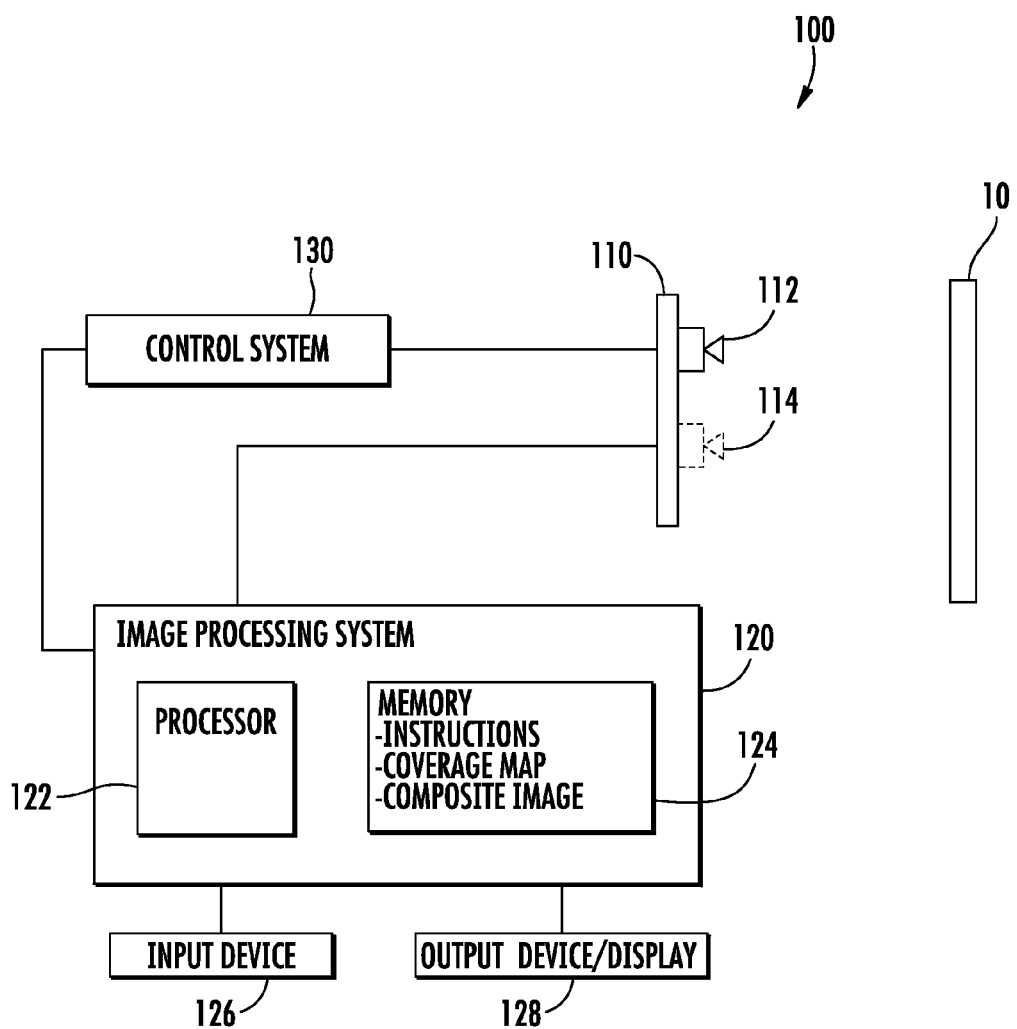
FIG. 1 depicts a block diagram of an exemplary system for identifying depth information according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for identifying depth information associated with an object. To identify depth information, imagery is captured using a sensor plane that is tilted with respect to an object and an object plane associated therewith. In such a configuration, certain portions of the sensor plane are closer to the object plane and certain portions of the sensor plane are farther from the object plane. The ability to have extremely shallow depth of fields allows for the utilization of software focus detection techniques to precisely determine the relative or absolute depths of the in-focus regions. In particular, image analysis can be performed to identify portions of images that satisfy an image quality metric, thereby providing an indication of the in-focus regions of the image. The in-focus regions can be compared to position data to determine depth information for such regions based on their location in the object plane and an associated depth of field plane. Such a method also allows for generation of a depth map of the object being captured.

The system and method described herein can create a depth map by arranging the depth information from a number of source images that are associated with a depth of field of the image capturing device. The depth information used to create the depth map comes from sections of the source images that are in-focus in the plane defined by the depth of field. The segments of the source images that meet a predetermined image quality metric can be identified and be assigned position data including depth positions based on the plane defined by the depth of field. Once the segments of the source images have been identified and assigned position data, a depth map can be created.

According to aspects of the present disclosure, a coverage map can be generated that identifies the coordinates of segments of the source images used in the depth map. The coverage map can be provided to a user to facilitate manual control of the capturing of additional source images. In addition, the coverage map can be used to control the image capture system to target additional source image captures to more efficiently complete the depth map. The control of the image capture system can also be automatically adapted based at least in part on the coverage map to optimize overlap between captures depending on calculations for estimated depth of field, angle off axis, and actual captured in-focus area.

The systems and methods of the present disclosure can also enhance the effectiveness of a multi-camera or multi-lens image capture system. For instance, the coverage map can provide the exact coordinates of in-focus imagery for each source image in the planes defined by the respective depth of fields of multiple cameras. This information can be used to arrange the depth information from acceptable portions of the source images into a global depth map even if the cameras are capturing imagery from vastly different portions of the object. The global depth map can also be used to provide efficient control of the multiple cameras to target missing segments in the global depth map.

FIG. 1 depicts a system 100 for generating a depth map of an object 10 according to an exemplary embodiment of the present disclosure. The system 100 includes an image capture system 110, an image processing system 120, and a control system 130 coupled to the image capture system 110. The image capture system 110 is used to capture a plurality of source images of the object 10. The source images can be used in generating a depth map of the object 10.

The image capture system 110 includes an image capture device 112, such as a digital camera. The digital camera can be configured to capture video and/or still images. As illustrated, the image capture system can include additional image capture devices, such as image capture device 114. Image capture device 114 is illustrated in dashed line to indicate that image capture system 110 can include any number of image capture devices as desired.

Figure 1A:
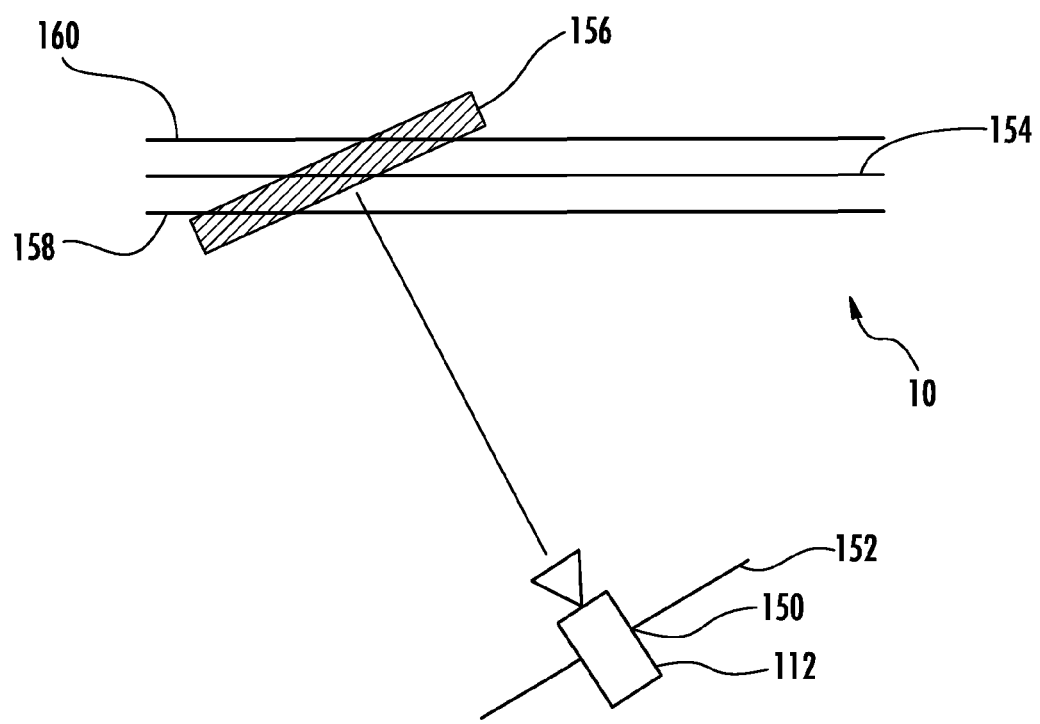
FIG. 1A depicts an image capture device from FIG. 1 angled in relation to an object to identify depth information according to an exemplary embodiment of the present disclosure.

FIG. 1A depicts the image capture device 112 of FIG. 1 having a sensor 150 defining a plane 152 that is tilted at a known angle with respect to an object plane 154 of the object 10 such that the image capture device 112 has a depth of field 156 associated with each source image. The depth of field 156 defines a plane that is angled with respect to the object plane 154. In this regard, the depth of field 156 contemplated by the present disclosure is extremely shallow. For instance, in certain aspects of the present disclosure, the image capture device 112 has a depth of field of less than 100μ. In still other aspects of the present disclosure, the image capture device 112 can have a depth of field of between 1μ and 100μ.

As can be seen in FIG. 1A, depth plane 158 is closer to sensor plane 152 than depth plane 160, which is farther away from sensor plane 152. Depth planes 158 and 160 represent the overall depth of the object 10 and depth of field 156 is angled such that in-focus regions extend across the entire depth of object 10. In this manner, as multiple images are acquired, a determination of depth can be made based upon the regions within the depth of field 156 that satisfy an image quality metric and are in-focus.

Figure 2:
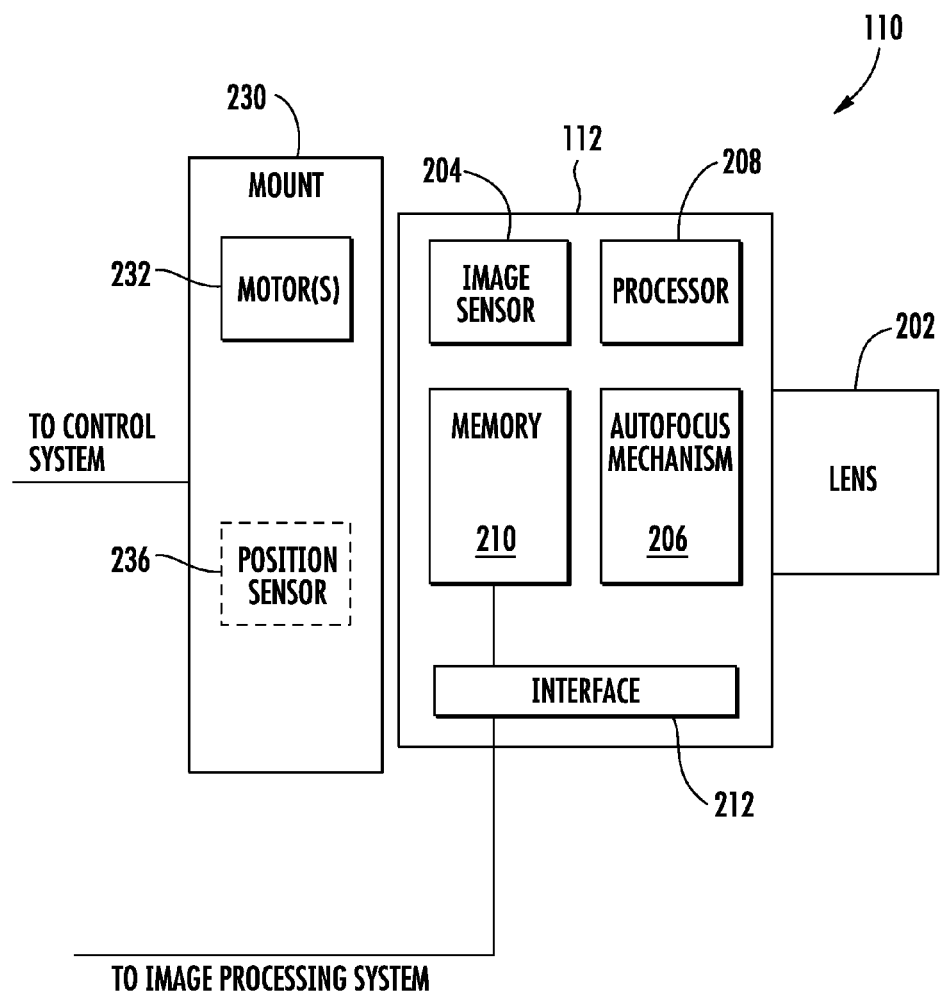
FIG. 2 depicts a block diagram of an exemplary image capture system according to an exemplary embodiment of the present disclosure.

FIG. 2 depicts a block diagram of an exemplary image capture system 110 according to an exemplary embodiment of the present disclosure. Image capture system 110 includes image capture device 112 that is mounted to a camera positioning device 230, such as a camera mount. The image capture device 112 includes typical components of a digital camera, such as a lens 202, an image sensor 204, a processor 208, and a memory 210. The image sensor 204 converts an optical image captured by the lens 202 and converts it into a digital image that can be stored in memory 210. The image sensor 204 can include an array of pixel sensors, such as an array of photodiodes. Each of the pixel sensors can output a signal that is used to generate a pixel of a digital image. The image capture device 112 can also be capable of capturing video so as to effectively capture a multitude of images in a short period of time, such images being processed in accordance with the present disclosure.

As will be discussed in detail below, position data for an image captured by the image capture device 112 can be determined based on information received from the image sensor 202. For instance, each pixel of the digital image can be associated with a position based on the associated pixel sensor in the image sensor 202. The location of the pixel in the image relative to the pixel sensor array in the image sensor 202 allows for accurate determination of where in the depth of field (shown in FIG. 1A) the pixel is located. The images captured by the image capture device 112 can be stored in memory 210 and can also be communicated via interface 212 to the image processing system 120 (shown in FIG. 1), along with associated position data, for use in generating a depth map.

Image capture device 112 further includes an autofocus mechanism 206. The autofocus mechanism 206 controls the lens 202 and various other components of the image capture device 112 to properly focus the image capture device 112 on the object. As the image capture device 112 is continuously capturing source images of an object, the autofocus mechanism 206 causes the image capture device 112 to bring the object into focus allowing the items in the image capture device's depth of field to be revealed.

Image capture device 112 can be mounted to a positioning device 230, such as a camera mount. The positioning device 230 is configured to adjust the position of the image capture device 112 relative to the object (while maintaining a known angle between the sensor plane and the object plane) as the image capture device captures a plurality of source images of the object. The positioning device 230 can be controlled by a control system, such as the control system 130 of FIG. 1, to point the image capture device 112 at various locations on the object. A control system can also be used to direct the image capture device 112 to capture various source images of the object at various locations on the object.

In a particular embodiment, the positioning device 230 can be a pan/tilt mount for the image capture device 230. The pan/tilt mount can adjust the pan angle and the tilt angle of the image capture device 112 relative to the object to capture a plurality of source images from various locations on the object. In another embodiment, the positioning device 230 can impart motion of the image capture device 112 along an x-axis, y-axis, and z-axis relative to the object to capture a plurality of source images of the object. Again, however, known geometry of the tilted sensor plane permits the accurate determination of the relative distances from the camera to the in-focus regions. Additionally, if the distance between the sensor plane and the object planes is known, absolute distances from the camera to the in-focus regions can be determined.

The positioning device 230 can include one or more motors 232 to control the position of the positioning device 230 pursuant to commands from a control system. The motors 232 can track position information, such a pan angle and a tilt angle of a pan/tilt camera mount. Alternatively, position information can be captured by one or more position sensors 236 associated with the positioning device 230. The position information or data can be associated with individual source images captured by image capture device 112 and communicated through interface 212 to an image processing system for use in determining depth information and generating a depth map as will be discussed below.

Referring back to FIG. 1, image processing system 120 includes one or more processor(s) 122 and a memory 124. Processor(s) 122 can be configured to receive input data including source images and associated position data from image capture system 110, and analyze such source images to identify suitable portions of the source images for depth information used in generating a depth map. Memory 124 can include any suitable computer-readable medium or media, including, but not limited to, RAM, ROM, hard drives, flash drives, or other memory devices.

Memory 132 stores information accessible by processor(s) 122, including instructions that can be executed by processor(s) 122. The instructions can be any set of instructions that when executed by the processor(s) 122, cause the processor(s) 122 to provide desired functionality. For instance, the instruction can cause the processor to analyze source images and assign position data to portions of the source image to generate a depth map.

The instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

Memory 124 can also include data that may be retrieved, manipulated, created, or stored by processor(s) 122. For instance, memory 124 can include source images received from the image capture system 110, position data associated with the source images, portions of the source images, a coverage map, and/or a depth map generated from the plurality of source images.

Image processing system 120 can include or be coupled to one or more input devices 126 and output devices 128. Input device 126 may correspond to one or more peripheral devices configured to operate as a user interface with image processing system 140. Exemplary input devices can include but are not limited to a keyboard, touch-screen monitor, microphone, mouse and other suitable input devices. Output device 148 may correspond to a visual display device. As will be discussed below, the visual display can be used to display the depth map or a coverage plot to a user.

Image processing system 120 can also be coupled to a control system 130. While control system 130 is depicted in FIG. 1 as separate from the image processing system 120, those of ordinary skill in the art, using the disclosures provided herein, should understand that the control system 130 could also be a part of the image processing system 120 and/or a part of the image capture system 110 without deviating from the scope of the present disclosure.

The control system 130 is used to provide commands to the various components of the image capture system 110 to control the capture of source images of the object 10. For instance, the control system 130 can control the position of the image capture device 112 relative to the object by sending control commands to a positioning device associated with the image capture device 112. The control system can also control the image capture device 112 by sending signals to the image capture device 112 directing the image capture device to capture source images of the object 10. Control system 130 can be any suitable control device, such as processor, microcontroller, or other suitable control circuit. According to aspects of the present disclosure, the control system can control the capture of additional source images by the image capture system 110 based at least in part on a coverage map or the depth map generated by the image processing system 120.

Due to the inherent flexibility of computer based systems, system 100 can take a variety of forms. For instance, in one embodiment, the image processing system 120 and control system 130 can be part of a general purpose computer. Alternatively, the image processing system 120 and control system 130 can be stand alone special purpose computing devices dedicated to perform the functionality discussed herein. Even still, the image processing system 120 and control system 130 can form part of the image capture system 110 and can be associated with either the positioning device 230 or image capture device 112.

Figure 3:
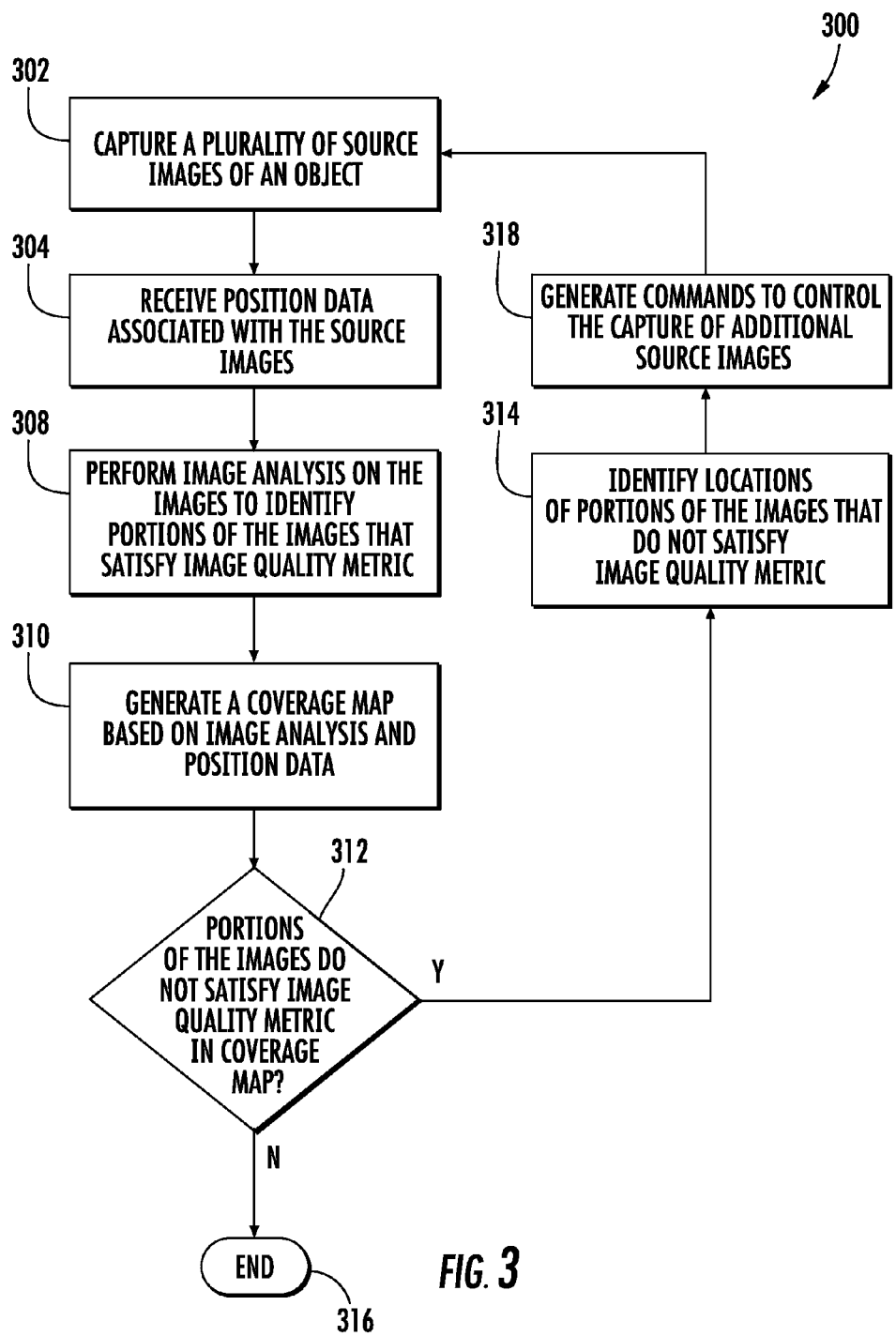
FIG. 3 depicts a flow chart of an exemplary method for identifying depth information according to an exemplary embodiment of the present disclosure.

FIG. 3 depicts a flow chart of an exemplary method 300 to generate a depth map according to an exemplary embodiment of the present disclosure. While the method 300 will be discussed with reference to the system 100 of FIGS. 1, 1A, and 2, those of ordinary skill in the art should understand that the exemplary method 300 can be performed by other suitable image capture systems.

Figure 4:
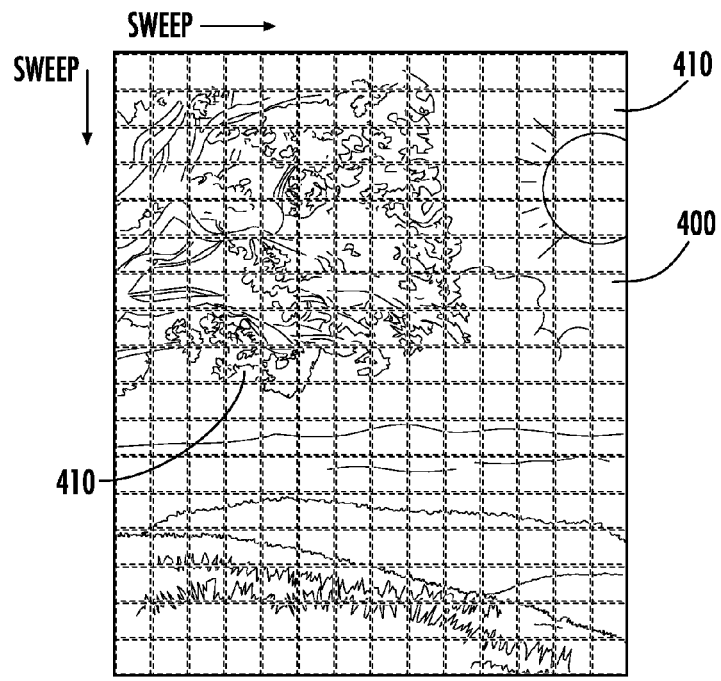
FIG. 4 depicts the image capture of an exemplary object to identify depth information for the object according to an exemplary embodiment of the present disclosure.

At (302), the method captures a plurality of source images of an object. FIG. 4 depicts the capture of a plurality of source images of an exemplary object 400, such as a work of art. The present disclosure is not limited to any particular type of object and can include, for instance, geographic areas, buildings, scenes, panoramas, etc.

As shown in FIG. 4, the image capture system 110 can be controlled to capture a plurality of individual source images 410 of the object 400. Each of the source images 410 is associated with a different region of the object 400. However, with reference again to FIG. 1A, because the sensor plane 152 is angled with respect to the object plane 154 of object 10, the depth of field 156 will extend across depth 158 to depth 160 and have an in focus region for every depth of object 10 as images are acquired. For instance, control system 130 can control the image capture system 110 to sweep the image capture device 112 to capture a plurality of source images 410 at various locations on the subject artwork 410. The sweep can be performed in any particular order, such as from left to right and from top to bottom. In certain aspects of the present disclosure, at least portions of the plurality of source images of the object 400 can be composited together to form an ultra high resolution image, such as a gigapixel image or a terapixel image.

Figure 5:
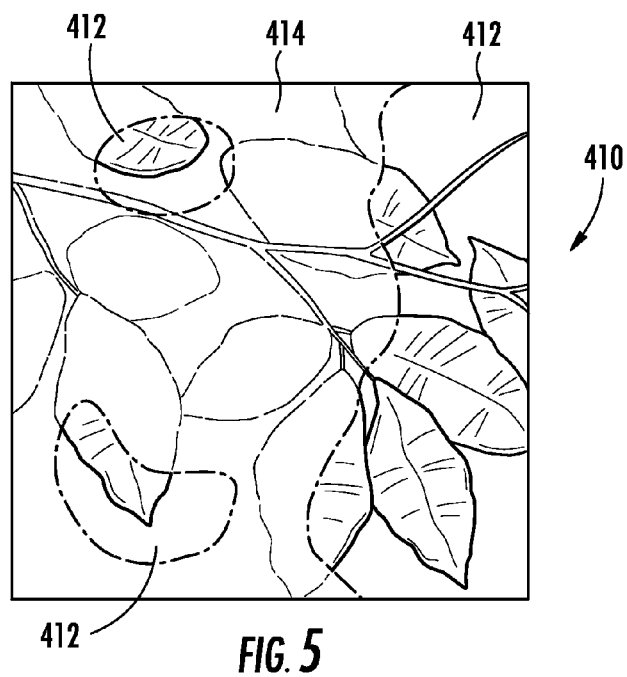
FIG. 5 depict an exemplary source image used to identify depth information for an object according to an exemplary embodiment of the present disclosure.

As discussed above, an autofocus mechanism 206 associated with the image capture device 112 can attempt to bring the subject artwork 400 into proper focus as the image capture device 112 sweeps the object 400. FIG. 5 demonstrates an exemplary source image 410. As shown, the source image 410 includes a plurality of segments 412 that are in proper focus. A substantial portion 414 of source image 410, however, remains out of focus because such portions are in a different plane from the depth of field for that particular image. As a result, such portions are not suitable for use in determining depth information or for creating a depth map of the subject artwork 400.

Referring back to FIG. 3 at (304), the method receives position data associated with the plurality of source images. The position data can be used to identify coordinates of individual pixels in the source images. In one example, each pixel in the plurality of source images can be assigned data corresponding to a position in a two-dimensional or three-dimensional space associated with the object. For instance, the data can identify the location of a pixel in an x-axis, y-axis, and/or z-axis associated with the object. This data is used to assign pixels to specific locations in a coverage map associated with a composite image. The position data can be used to identify coordinates of individual pixels in the segments and associate such pixels with a depth of field that can be correlated to a depth position in relation to the object plane. The position data can be used to generate a coverage plot of the depth map and to generate the depth map itself.

The position data can be assigned to individual pixels based on information received from the image capture system. For instance, the positioning device 230 (shown in FIG. 2) used in the image capture system 110 can track position information, such as a pan angle and tilt angle of the image capture device 112, as the image capture device 112 captures the source images. This position information can be associated with the source image for use in assigning position data to individual pixels in the captured source images. As an example, the pan angle and the tilt angle associated with a particular source image can be used to calculate positions of pixels the source image.

Further still, position information can be based on information from an image sensor of the image capture device. For instance, each pixel in a source image can be associated with a pixel sensor in a pixel sensor array of the image sensor 204 (shown in FIG. 2). The particular pixel sensor can provide location information for each pixel in the source image. Specific x, y, and/or z coordinates can be assigned to individual pixels in segments of the source images based on information derived from the pixel sensor array of the image sensor 204 and the position information from the positioning device 230.

At (308), the method analyzes the plurality of source images 410 captured by the image capture system 110 to identify segments of the source images that are suitable for use in determining depth information. However, it should also be appreciated that image analysis can take place as each individual source image is captured rather than after a plurality of source images are captured. In a particular implementation, the image processing system 120 performs image analysis techniques on the source images 410 to identify portions of the source images that satisfy an image quality metric. The method performs image analysis on the images to identify portions of the images that are properly in focus and portions of the composite image that are not properly in focus.

For instance, the image processing system 120 (FIG. 1) can perform image analysis on images to identify portions of the images that satisfy an image quality metric. The image quality metric can be any objective measurement of the suitability of a portion of the composite image for use in generating a depth map. In one example, the image quality metric can provide a measure of the sharpness of the image.

The sharpness of particular portions of an image can be assessed by analyzing the frequency components of the image. For instance, the sharpness of a particular portion of an image can be analyzed by determining the ratio of high frequency components of a portion of the image to the low frequency components of the image. Portions of the image having a relatively high ratio of high frequency components to low frequency components can have a sharp appearance. In contrast, portions of the image having a relatively low ratio of high frequency components to low frequency components can result in the image having a duller, more out-of-focus appearance. These portions of the image indicate the image was not in focus and, thus, in a different plane from the depth of field associated with that particular image.

Figure 6:
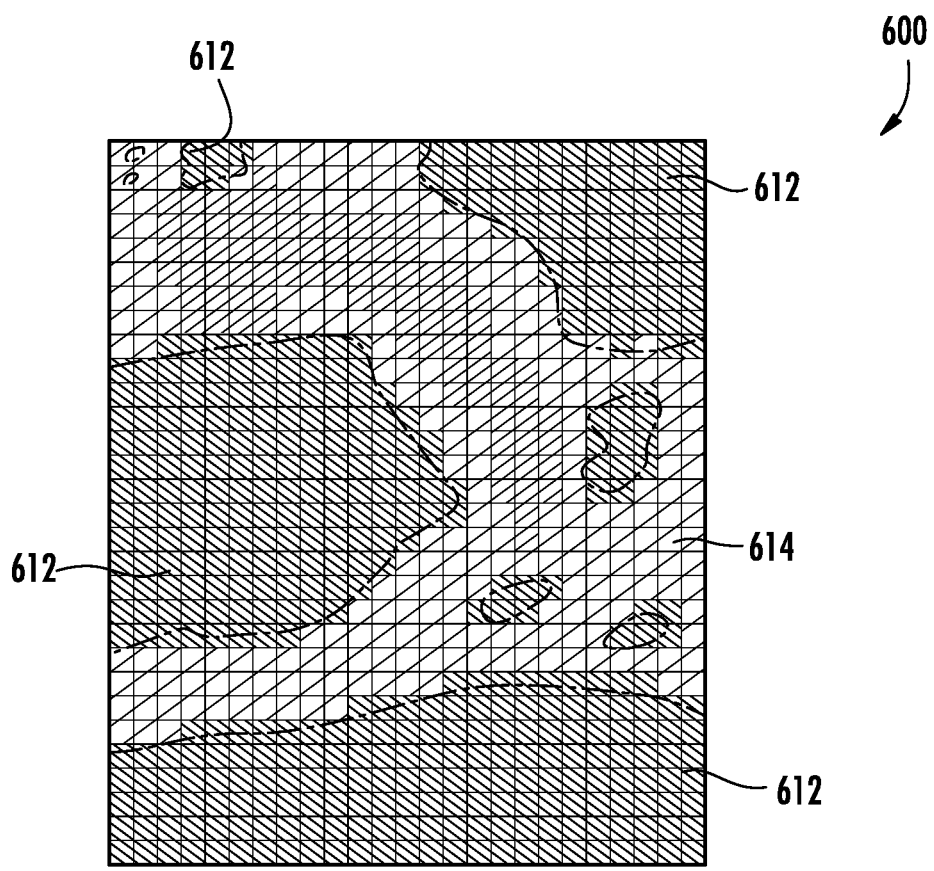
FIG. 6 depicts an exemplary source image after undergoing image analysis to identify image segments that satisfy an image quality metric according to an exemplary embodiment of the present disclosure.

FIG. 6 shows an exemplary gray scale image 600 of a source image that has undergone image analysis as discussed above. The pixels 614 having a lighter shading are representative of lighter grayscale tones corresponding to portions of the image that have a reduced sharpness. The pixels 612 having darker shading are representative of darker grayscale tones corresponding to portions of the source image that have a sharpness sufficient to indicate that they are in focus and are in the depth of field associated with the image, allowing the depth information to be calculated and included in the depth map.

Based on the image analysis, the method can control the capture of additional source images to recapture images of regions of the object that did not satisfy the image quality metric. For instance, the image processing system 120 (shown in FIG. 1) can generate control commands for implementation by the control system 130 (shown in FIG. 1) to control the image capture system 110 (shown in FIG. 1) to recapture the source images of particular regions of the object.

In one implementation, the method controls the capture of additional source images by using a coverage map. For instance, referring back to FIG. 3 at (310), the method generates a coverage map based on the image analysis and position data associated with the source images. The coverage map precisely identifies the coordinates of the portions of an individual image or the composite image that satisfy and/or do not satisfy the image quality metric. The coverage map can be generated in any suitable manner. In one embodiment, the coverage map is generated by identifying pixels or groups of pixels in the composite image that satisfy the image quality metric and analyzing position data associated with the identified pixels. The collected information can then be compiled into a coverage map for use in controlling the capture of additional source images.

The coverage map can be any compilation of data that identifies locations of suitable and/or unsuitable portions of the composite image for generating depth information. For instance, the coverage map can simply be a data compilation or table identifying pixel coordinates for pixels or groups of pixels for which depth information is known. The data compilation could also identify pixel coordinates for pixels or groups of pixels that do not satisfy the requisite image quality metric.

Figure 7:
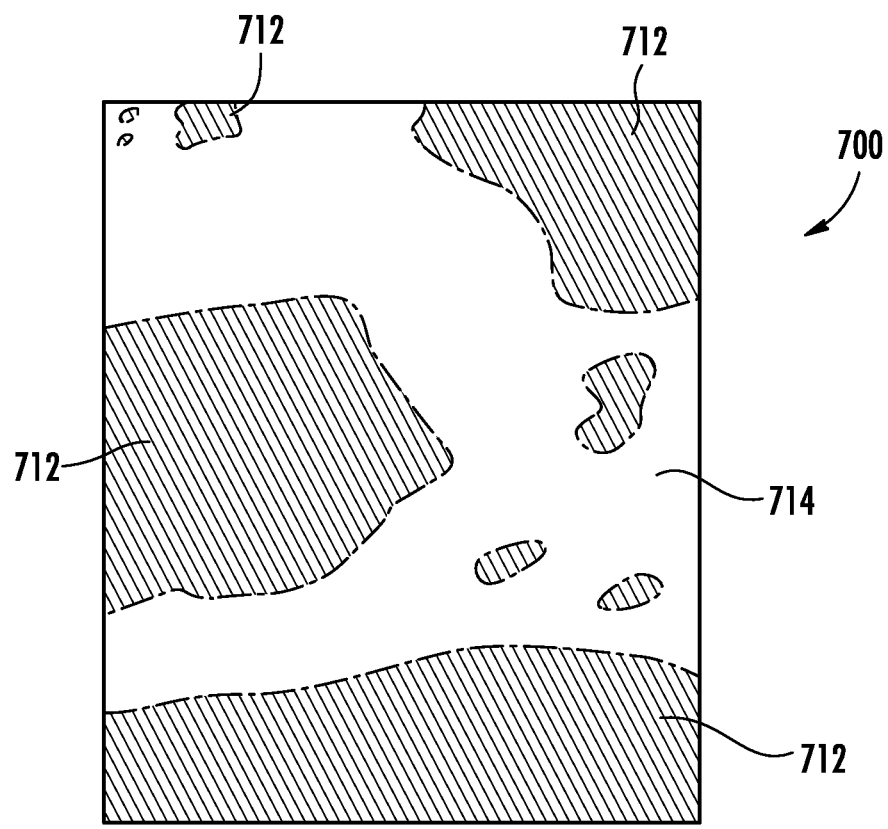
FIG. 7 depicts a coverage map of an exemplary composite image according to an exemplary embodiment of the present disclosure.

In one example, the coverage map can include a plot of the locations of both suitable portions and unsuitable portions of the composite image in a two-dimensional or three-dimensional space corresponding to the object. FIG. 7 depicts an exemplary plot of a coverage map 700 associated with the object 400 of FIG. 4. As shown, the plot of the coverage map 700 identifies locations of portions of the composite image that satisfy the image quality metric, and therefore have associated depth information. In particular, the coverage map 700 includes shaded pixels 712 corresponding to higher pixel values at locations of suitable or in-focus portions of the composite image. The coverage map 700 also includes lighter pixels corresponding to lower pixel values at locations of unsuitable or out-of-focus portions. The coverage map 700 can be presented on a display device to a user for assistance in the generation of the depth map.

Referring to FIG. 3 at (312), the method analyzes the coverage map to identify portions that do not satisfy the image quality metric, such as out-of-focus portions, in the composite image. For instance, the image processor 120 (shown in FIG. 1) can analyze the coverage map to determine whether one or more portions of the composite image do not satisfy the image quality metric. If the composite image does not include unsuitable portions, the entirety of the composite image satisfies the image quality metric and all depth information can be determined allowing a depth map to be created and the method ends as shown at (316).

The depth map can be any compilation of data that identifies object depth information. For instance, the depth map can simply be a data compilation or table identifying depth information for sections of the object for which depth information is known. The data compilation could also identify sections for which depth information is now known. Depth information can be relative to other sections of the object or can be actual depth.

If one or more portions of the composite image that do not satisfy the image quality metric are identified, the method identifies the locations of these regions from the coverage map (314). For instance, the image processor 120 (shown in FIG. 1) can extract position data from the coverage map concerning the precise coordinates of any portions of the composite image that do not satisfy the image quality metric.

Once these coordinates are known, the method can generate control commands to recapture source images of the object associated with one or more portions of the composite image that do not satisfy the image quality metric (318) and for which depth information cannot be determined In one example, the coordinates of all portions of the composite image that do not satisfy the image quality metric can be compiled into a global list or compilation. The global list or compilation can be analyzed by the image processing system 120 (shown in FIG. 1) to determine a control routine for the recapture of source images. The control routine can be calculated based on depth of field, angle off axis, the coordinates of the portions of the composite image that do not satisfy the image quality metric and other suitable parameters. The control routine can specify control commands that can be implemented by the control system 130 (shown in FIG. 1) to control the image capture system 110 (shown in FIG. 1) to recapture source images of regions of the object associated with the out-of-focus portions of the composite image.

In one particular example, the control commands can be used to control an image capture system having a plurality of image capture devices. In particular, control commands for all image capture devices can be generated based on the locations of out-of-focus portions in the composite image. In this manner, the composite image and/or associated coverage map acts as a global resource for generating control commands for each of the plurality of image capture devices.

The additional source images captured pursuant to the control commands can be processed in a similar manner to the steps of the method 300 outlined above. The image processing system 120 (shown in FIG. 1) can replace portions of the composite image with higher quality portions from the recaptured source images, improving the overall image quality of the composite image. The method 300 can be repeated until all portions of the composite image meet the image quality metric, resulting in suitable depth information that can be used to create a depth map of an object.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for identifying depth information associated with an object, the method comprising:
    capturing, with an image capturing device, a plurality of source images of the object, the image capturing device comprising a sensor that is tilted at a known angle with respect to an object plane of the object such that the image capturing device has a depth of field associated with each source image, the depth of field defining a plane that is angled with respect to the object plane and that extends across the depth of the object;
    analyzing, with an image processor, the plurality of source images to identify segments of the source images that satisfy an image quality metric indicative of suitability for use in generating a depth map of the object; and
    assigning position data to the identified segments of the source images and identifying coordinates of individual pixels in the identified segments based on the position data, the position data comprising depth positions calculated based on each segment's location relative to the object plane of the object and the plane defined by the depth of field.

2. The method of claim 1, wherein the depth of field associated with each source image is less than 100µ.

3. The method of claim 1, wherein the image quality metric provides a measure of the sharpness of the source image.

4. The method of claim 3, wherein the image quality metric is based at least in part on the ratio of high frequency components to low frequency components of the source image.

5. The method of claim 1, wherein the identified segments from the source images comprise non-contiguous segments from a source image.

6. The method of claim 1, wherein the image capture device comprises a positioning device coupled to the image capture device, the positioning device configured to adjust the position of the image capture device relative to the object as the image capture device captures the plurality of source images.

7. The method of claim 6, wherein the position data comprises information received from the image capture device identifying the position of the image capture device when a source image was captured.

8. The method of claim 6, wherein the position data comprises information received from the image sensor associated with the image capture device identifying the location of individual pixels in the source image.

9. The method of claim 1, wherein the method further comprises:
arranging the identified segments to generate a depth map for at least a portion of the object based on the position data.

10. The method of claim 9, wherein the method further comprises:
analyzing the depth map to determine missing segments; and
controlling the image capture device to capture source images associated with the missing segments.

11. The method of claim 10, wherein the image capture device comprises a plurality of cameras.

12. The method of claim 11, wherein the method comprises controlling the plurality of cameras to capture additional source images based at least in part on the depth map.

13. The method of claim 9, wherein the depth map comprises a gigapixel image.

14. The method of claim 9, wherein the depth map comprises a terapixel image.

15. The method of claim 9, further comprising displaying the depth map on a display device.

16. The method of claim 1, wherein the object is a painting.

17. A system for identifying depth information associated with an object, comprising:
an image capture device configured to capture a plurality of source images of an object, the image capture device comprising a sensor that is tilted at a known angle with respect to an object plane of the object such that the image capture device has a depth of field associated with each source image, the depth of field defining a plane that is angled with respect to the object plane and that extends across the depth of the object;
a processor; and
a memory configured to store the plurality of source images, the memory comprising instructions that when executed by the processor cause the processor to perform the operations of:
analyzing the plurality of source images to identify segments of the source images that satisfy an image quality metric indicative of suitability for use in generating a depth map of the object; and
assigning position data to the identified segments of the source images and identifying coordinates of individual pixels in the identified segments based on the position data, the position data comprising depth positions calculated based on each segment's location relative to the object plane of the object and the plane defined by the depth of field.

18. The system of claim 17, wherein the image capture device comprises an autofocus mechanism used during the capture of the plurality of source images.

19. The system of claim 17, wherein the depth of field associated with each source image is less than 100μ.

20. The system of claim 17, wherein the image quality metric provides a measure of the sharpness of the image.

21. The system of claim 20, wherein the image quality metric is based at least in part on the ratio of high frequency components to low frequency components of the source image.

22. The system of claim 17, wherein the system further comprises a positioning device configured to adjust the position of the image capture device relative to the object as the image capture device captures the plurality of source images.

* * * * *